(12) United States Patent
Swaminathan (10) Patent No.: US 8,781,464 B2
(45) Date of Patent: Jul. 15, 2014

(54) SYSTEM AND METHOD OF DECREASING TIME TO BEGIN ACQUISITION OF CELLULAR NETWORKS AFTER POWER UP

(75) Inventor: Arvind Swaminathan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 50 days.

(21) Appl. No.: 13/347,417

(22) Filed: Jan. 10, 2012

(65) Prior Publication Data

US 2012/0208534 A1    Aug. 16, 2012

Related U.S. Application Data (60) Provisional application No. 61/436,808, filed on Jan. 27, 2011.

(51) Int. Cl.
*H04W 48/18* (2009.01)

(52) U.S. Cl.
USPC .......................... 455/434; 455/553.1; 707/769

(58) Field of Classification Search
CPC ............................... H04W 8/183; H04W 88/06
USPC ...................... 455/434, 432.3, 432.1; 370/255
See application file for complete search history.

(56) References Cited

U.S. PATENT DOCUMENTS

| 7,937,083 B2 | 5/2011 | Oommen |
|---|---|---|
| 2006/0009216 A1 | 1/2006 | Welnick et al. |
| 2010/0015978 A1 | 1/2010 | Yoon et al. |
| 2010/0105378 A1 | 4/2010 | Shi et al. |
| 2010/0144342 A1 | 6/2010 | Kondo |
| 2010/0214958 A1* | 8/2010 | Wijayanathan et al. ...... 370/255 |
| 2011/0003590 A1 | 1/2011 | Yoon et al. |
| 2011/0092208 A1 | 4/2011 | Swaminathan et al. |

FOREIGN PATENT DOCUMENTS

WO   WO2011022697 A1   2/2011

OTHER PUBLICATIONS

International Search Report and Written Opinion—PCT/US2012/020962—ISA/EPO—Mar. 14, 2012.

* cited by examiner

*Primary Examiner* — Phuoc H Doan
(74) *Attorney, Agent, or Firm* — Patterson & Sheridan, L.L.P.

(57) ABSTRACT

In the system-selection solution used in wireless devices, system selection files may be read from a Universal Integrated Circuit Card (UICC) and converted into a priority list. The priority list may specify the relative priority of 3GPP and 3GPP2 systems and govern system selection by a device. Traditionally, generation of the priority list may be performed at every power up of the device. However, the reading of the system selection files from the UICC and generation of the priority list may take a period of time which may affect the performance of the device. For certain aspects of the present disclosure, the priority list may be generated after power up only when system selection files change. Therefore, the time for acquiring a wireless network upon the power up of a device may be reduced, particularly when system selection files remain the same as before.

52 Claims, 8 Drawing Sheets

SYSTEM AND METHOD OF DECREASING TIME TO BEGIN ACQUISITION OF CELLULAR NETWORKS AFTER POWER UP

CROSS-REFERENCE TO RELATED APPLICATION

This application claims priority to U.S. Provisional Application Ser. No. 61/436,808, filed on Jan. 27, 2011, which is expressly incorporated by reference herein in its entirety.

TECHNICAL FIELD

Certain aspects of the present disclosure generally relate to wireless communications and, more particularly, to techniques for decreasing the time to begin acquisition of cellular networks after power up of a wireless device.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there recently has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems.

SUMMARY

In an aspect of the disclosure, a method for wireless communications is provided. The method generally includes, upon power up of a wireless device, determining if one or more system selection files of existing system selection files have changed, and performing network scanning utilizing the existing system selection files if the one or more system selection files have not changed.

In an aspect of the disclosure, an apparatus for wireless communications is provided. The apparatus generally includes, upon power up of a wireless device, means for determining if one or more system selection files of existing system selection files have changed, and means for performing network scanning utilizing the existing system selection files if the one or more system selection files have not changed.

In an aspect of the disclosure, an apparatus for wireless communications is provided. The apparatus generally includes at least one processor and a memory coupled to the at least one processor. The at least one processor is generally configured to, upon power up of a wireless device, determine if one or more system selection files of existing system selection files have changed, and perform network scanning utilizing the existing system selection files if the one or more system selection files have not changed.

In an aspect of the disclosure, a computer-program product for wireless communications is provided. The computer-program product generally includes a computer-readable medium having code for, upon power up of a wireless device, determining if one or more system selection files of existing system selection files have changed, and performing network scanning utilizing the existing system selection files if the one or more system selection files have not changed.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

In the system-selection solution used in wireless devices, system selection files may be read from a Universal Integrated Circuit Card (UICC) and converted into a priority list. The priority list may specify the relative priority of 3GPP and 3GPP2 systems and govern system selection by a device. Traditionally, generation of the priority list may be performed at every power up of the device. However, the reading of the system selection files from the UICC and generation of the priority list may take a period of time, which may affect the performance of the device. For certain aspects of the present disclosure, the priority list may be generated after power up only when system selection files change. Therefore, the time for acquiring a wireless network upon the power up of a device may be reduced, particularly when system selection files remain the same as before.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 1:
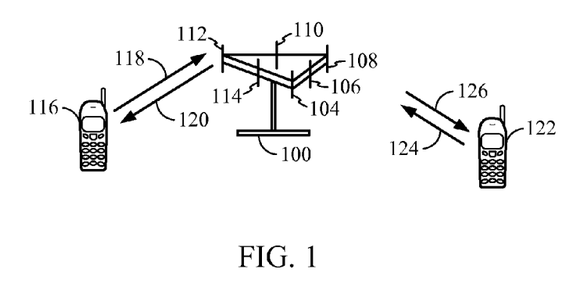
FIG. 1 illustrates an example multiple access wireless communication system in accordance with certain aspects of the present disclosure.

Referring to FIG. 1, a multiple access wireless communication system according to one aspect is illustrated in which procedures described for reducing the time to begin acquisition of wireless networks may be performed. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
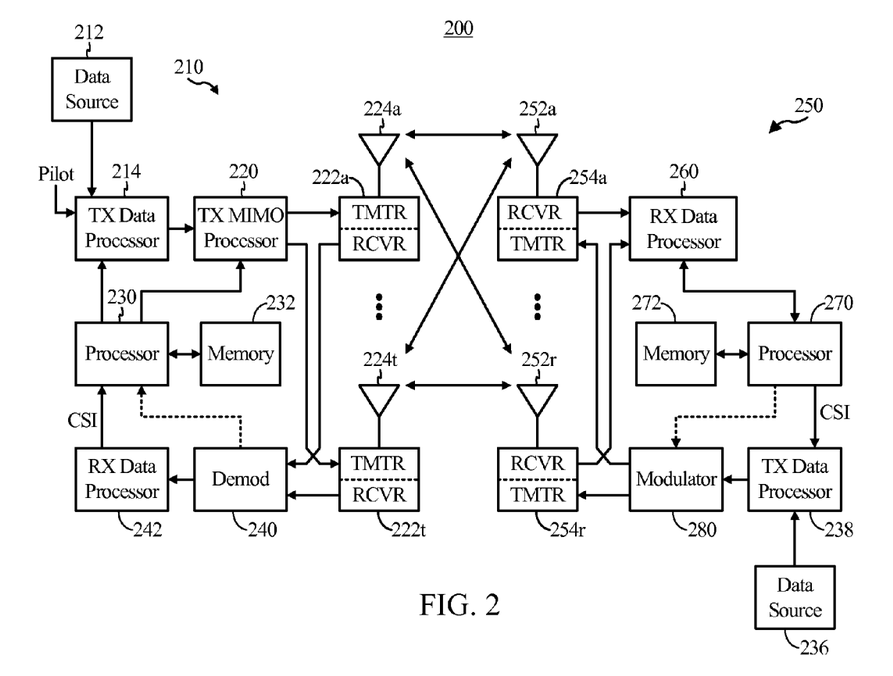
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and down-converts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
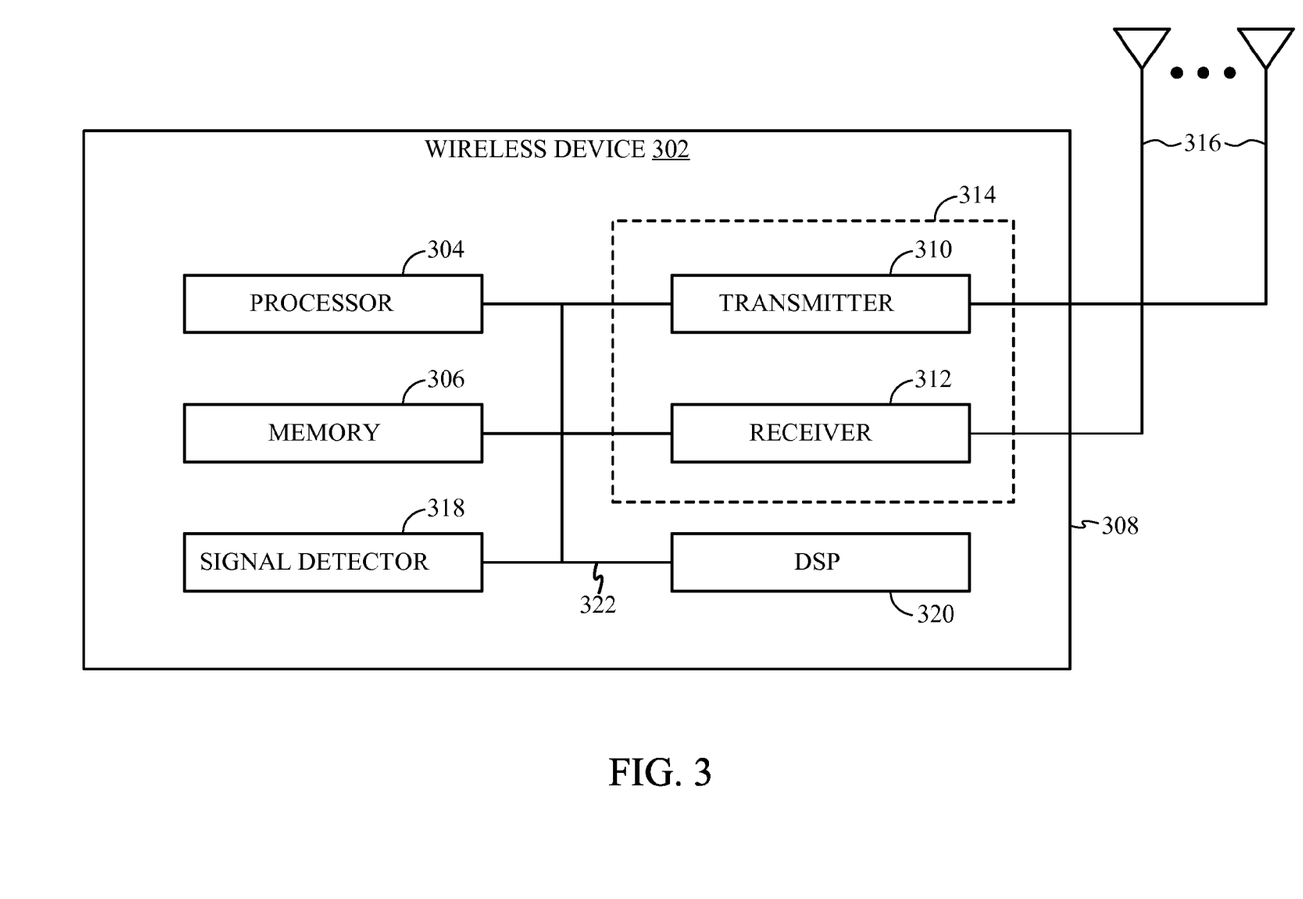
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

System Selection for Multi-Mode Wireless Systems

According to one feature, a unified approach to network/system selection is provided for a mobile device implementing multi-mode system selection (MMSS). For example, a multi-mode wireless communication device may be capable of communicating according to GSM, cdma2000, Data Optimized (DO), Wideband CDMA (WCDMA), and/or Long Term Evolution (LTE) standards from which it may select a preferred air interface. The selection of a preferred network/system may depend on a number of factors such as the operating region of the wireless communication device (also referred to as mobile station, access terminal, client terminal, mobile phone, etc.) and roaming agreements between operators, among others. The framework for MMSS includes two parts: (a) provisioning of databases in the wireless communication device with a list of systems; and (b) specifying a set of rules used by the wireless communication device to determine the most preferred system (e.g., wireless technology, network, or operator) available in its current operating region using the provisioned database.

Multiple frameworks for addressing issues related to MMSS have been defined in different standards bodies. The MMSS framework requires the use of information in different system selection files (e.g., PRL, PLMN DB, MSPL, and MLPL). The collective information in all these files may be used by a wireless device to determine the system to camp on.

Figure 4:
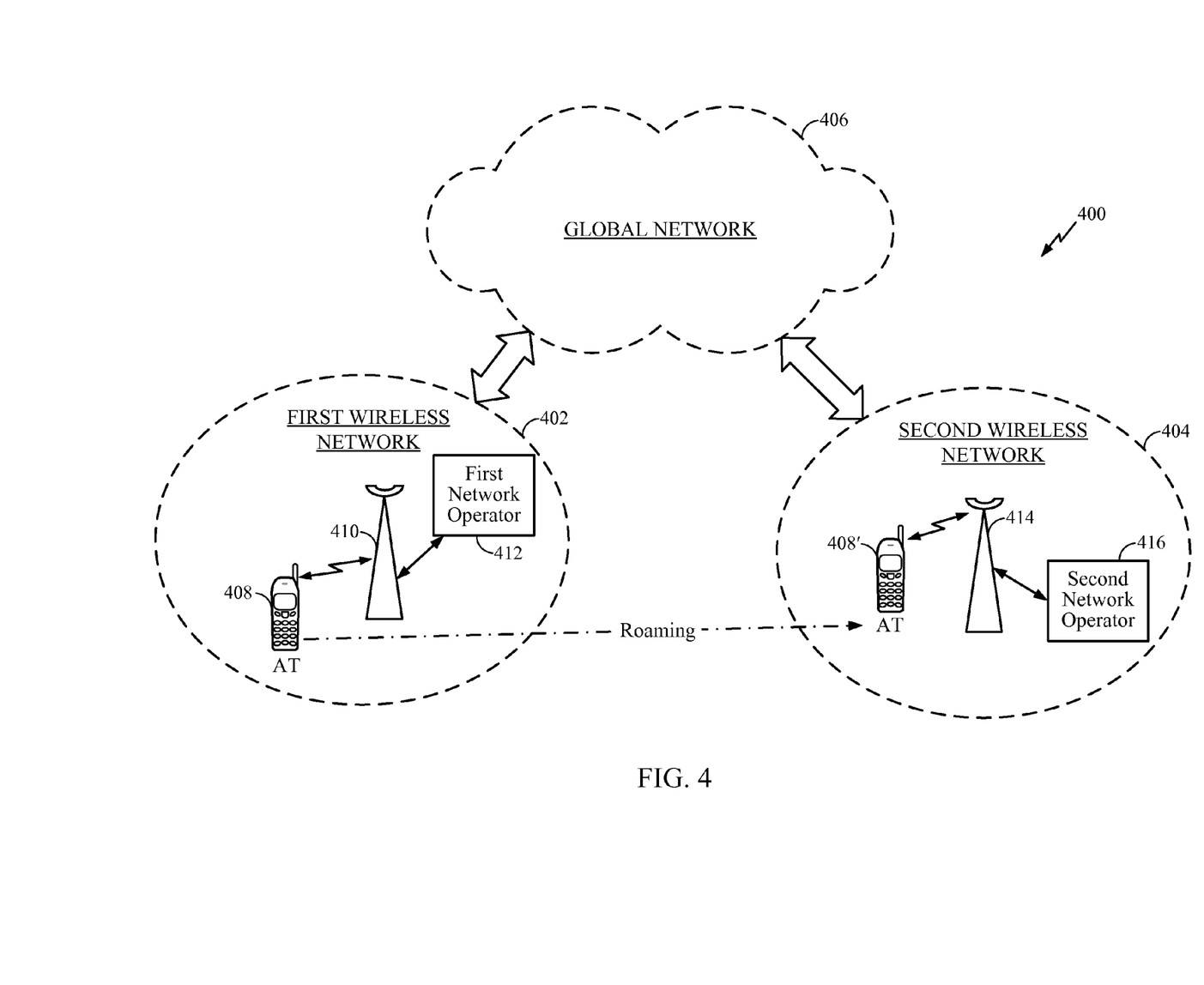
FIGS. 4-5 illustrate examples of a network environment in which a wireless communication device may be adapted to perform a multi-mode system selection process, in accordance with certain aspects of the present disclosure.

FIG. 4 illustrates an example of a network environment in which a wireless communication device may be adapted to perform a unified multi-mode system selection process using a common database, in accordance with certain aspects of the present disclosure. The network environment 400 may include a plurality of linked networks, such as a first wireless network 402, a second wireless network 404, and a global network 406. For example, the first wireless network 402 may provide wireless connectivity to mobile devices (i.e., wireless communication devices) via one or more wireless access points 410. The first wireless network 402 may be operated by a first network operator 412 according to a first wireless communication standard. For example, the first wireless operator 412 may implement a first MMSS database having a first database framework. Similarly, a second wireless network 404 may provide wireless connectivity to mobile devices via one or more wireless access points 414. The second wireless network 404 may be operated by a second network operator 416 according to a second wireless communication standard. For example, the second wireless operator 416 may implement a second MMSS database having a second database framework.

The global network 406 may include a plurality of interconnected networks, such as the Internet, and may be communicatively coupled to (or include) the first and second wireless networks 402 and 404. The global network 406 may be a packet switched network (such as the Internet).

The mobile device 408 may be capable of operating according to multiple communication standards (e.g., standards defined by 3GPP and 3GPP2). As the mobile device 408 roams from the first wireless network 402 and into the second wireless network 404, the mobile device 408 may change network operators (from the first network operator 412 to the second network operator 416). As a result of moving into the second wireless network 404, the mobile device 408' may also change from using the first MMSS database to the second MMSS database.

Figure 5:
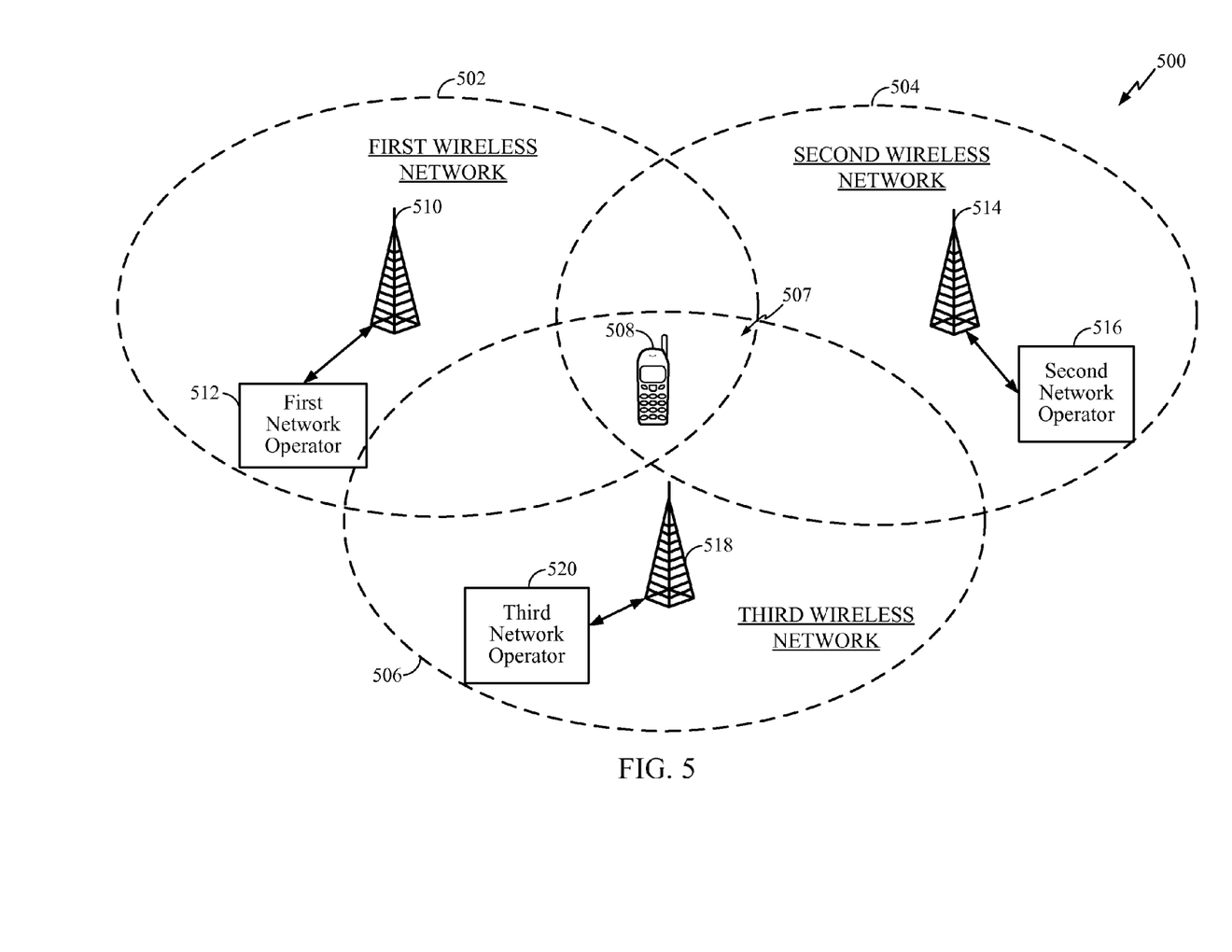

FIG. 5 illustrates an example of a network environment in which a wireless communication device may be adapted to perform a multi-mode system selection process, in accordance with certain aspects of the present disclosure. The network environment 500 may include a plurality of networks, such as a first wireless network 502, a second wireless network 504, and a third wireless network 506. In contrast to the example in FIG. 4, two or more of the networks 502, 504, and/or 506 may have overlapping network regions 507 of operation.

For example, the first wireless network 502 may provide wireless connectivity to mobile devices (i.e., wireless communication devices) via one or more wireless access points 510 and may be operated by a first network operator 512 according to a first wireless communication standard. Similarly, a second wireless network 504 may provide wireless connectivity to mobile devices (i.e., wireless communication devices) via one or more wireless access points 514 and may be operated by a second network operator 516 according to a second wireless communication standard. Likewise, a third wireless network 506 may provide wireless connectivity to mobile devices (i.e., wireless communication devices) via one or more wireless access points 518 and may be operated by a third network operator 520 according to a third wireless communication standard The mobile device 508 may be capable of operating according to multiple communication standards (e.g., standards defined by 3GPP and 3GPP2). As the mobile device 508 moves into a region 507, where two or more of the networks 502, 504, and/or 506 operate, the mobile device 508 may have to decide between establishing communications via the first, second, or third network 502, 504, or 506. In making such decision, the mobile device 508 may use collective information in provisioned system priority files to determine a set of rules that define a priority among the available networks 502, 504, and/or 506. If the provisioned system priority files are based on the 3GPP2 MMSS standard, the provisioned system priority files generally include the PRL, PLMN DB, MSPL and MLPL.

Figure 6:
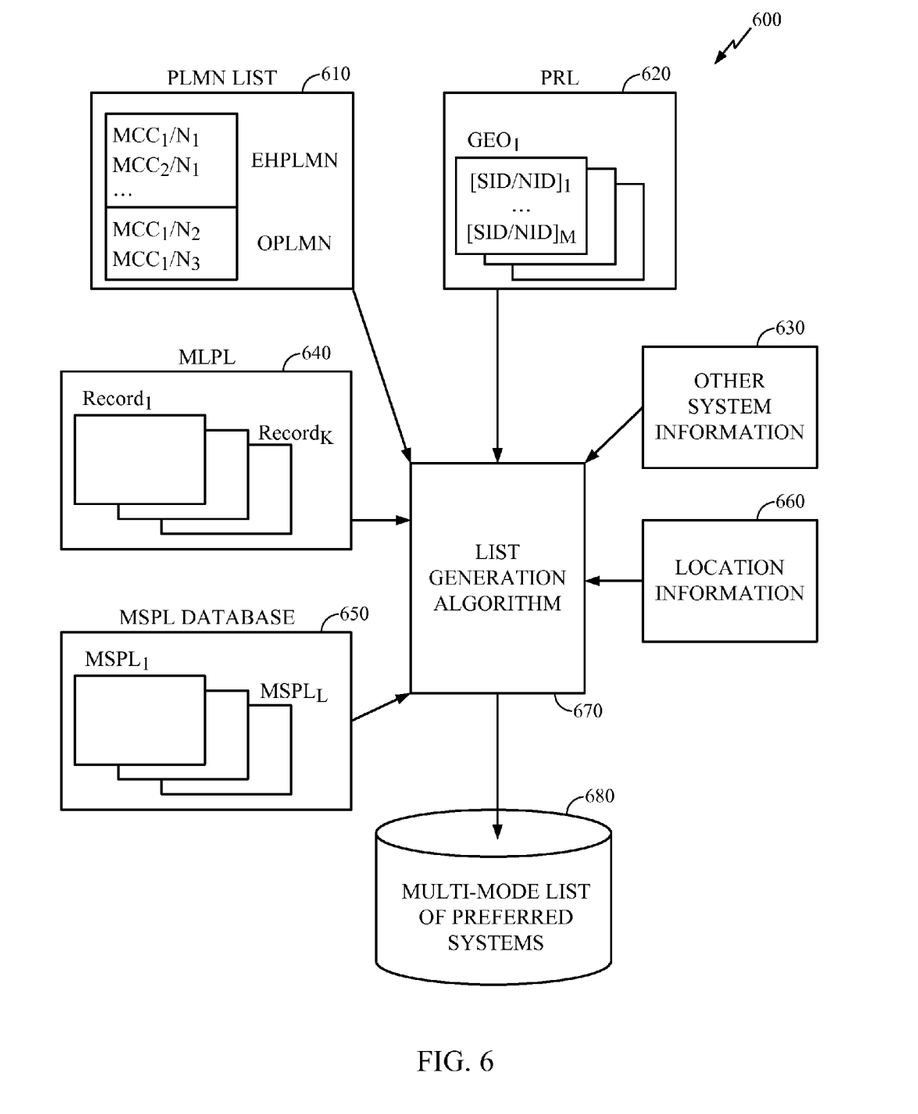
FIG. 6 illustrates an example of a technique for generating a multi-mode preferred system list, in accordance with certain aspects of the present disclosure.

A specific, non-limiting example of a system select procedure overlay implementation, as well as a specific example of a technique for generating a multi-mode preferred system list (i.e., a combined list), is illustrated by system 600 in FIG. 6. As FIG. 6 illustrates, system select information in the form of databases 610-650 may be utilized by a mobile handset and/or any other suitable device. More particularly, the databases generally include a Public Land Mobile Network (PLMN) list 610, a Preferred Roaming List (PRL) 620, one or more other system information databases 630, an MMSS Location Priority List (MLPL) 640, and an MMSS System Priority List (MSPL) database 650.

In one specific example, PLMN list 610 may include a list of PLMNs and can be configured as a small, coarse network list in order to minimize the amount of space required for its storage. For example, respective networks in PLMN list 610 can be identified using only a mobile country code (MCC) corresponding to a country in which the network is located and a mobile network code (MNC) corresponding to an operator of the network and placed in PLMN list 610 in decreasing order of priority. It should be appreciated, however, that PLMN list 610 could utilize any suitable formatting and/or information. As further illustrated, PLMN list 610 can be constructed using an Equivalent Home PLMN (EHPLMN) list, which can specify networks classified as home networks, an Operator PLMN (OPLMN) list, which can specify one or more preferred networks, and/or any other suitable lists.

In another specific example, PRL 620 may include a list of systems identified by respective system identification numbers (SIDs) and/or network identification numbers (NIDs). In contrast to the PLMN list 610, the PRL 620 may be a more granular, detailed list that favors detail of information over storage space requirements. Accordingly, in addition to SID/NID and RAT information, the PRL 620 can additionally contain information such as radio frequency (RF) band-class and/or channel information, acquisition type information, and/or other information relating to respective systems. Further, PRL 620 may include priority level information that can enable multiple systems to share the same priority level. As further illustrated in FIG. 6, PRL 620 may be grouped into smaller lists for systems located in common geo-spatial locations or GEOs, which can correspond to cities, states, and/or other geographic regions.

Thus, in accordance with one aspect, it can be appreciated that the PLMN list 610 and the PRL 620 may provide system select procedures for a mobile handset for various radio technologies. As system 600 further illustrates, one or more other sets 630 of system select procedures may also be utilized.

In accordance with another aspect, a system select procedure overlay may be provided in system 600 by way of a MLPL 640 and a MSPL database 650. In one example, MLPL 640 may contain a set of MLPL records, each of which can identify at least one system. In one example, MLPL 640 can include records for systems listed in PLMN list 610, PRL 620, other system information 630, and/or any other suitable listings. Further, each record in MLPL 640 can point to a MSPL in the MSPL database 650. In one example, respective MSPLs in MSPL database 650 can provide rules that specify a priority listing of the systems that point to it.

A list generation algorithm 670 may be utilized, which can integrate information from databases 610-650 to create a single multi-mode list of preferred systems 680 (i.e., a combined list). In one example, list generation algorithm 670 can compile information from databases 610-650 into a single list 680 that contains the detail of PRL 620 while still supporting coarser lists such as PLMN list 610. In another example, list generation algorithm 670 can be designed to expand information provided in PLMN list 610 using MLPL database 640 and/or MSPL database 650, allowing system selection to be conducted with further detail and granularity than is supported by traditional MMSS approaches. In a further example, list generation algorithm 670 can additionally utilize location information 660 to generate a multi-mode list of preferred systems 680 that is specific to a given geographic area. Generation of a list 680 for particular location information 660 can be done in a single action for a set of locations, or an alternative aspect list generation algorithm 670 can be automatically triggered upon detecting a change in the location of an associated device.

System and Method of Decreasing Time to Begin Acquisition of Cellular Networks after Power Up In the system-selection solution used in wireless devices (e.g., LTE multimode devices), system selection files (i.e., MMSS files) may be read from a Universal Integrated Circuit Card (UICC) and converted into a master system priority list (e.g., multi-mode list of preferred systems 680) that combines information from the different MMSS files. MMSS files generally include a preferred roaming list (PRL), public land mobile network (PLMN) database files, an MMSS system priority list (MSPL), an MMSS location associated priority list (MLPL), and Third Generation Partnership Project (3GPP) base station transceivers (BST), as illustrated in FIG. 6. The master system priority list may specify the relative priority of 3GPP and 3GPP2 systems and govern system selection by a wireless device (e.g., by performing network scanning). For some embodiments, priority of 3GPP and 3GPP2 systems may be determined by reading the system selection files from the UICC separately, without combining the information from the files into the master system priority list. However, examples utilizing the master system priority list will be further described.

Traditionally, generation of the master system priority list may be performed at every power up of the device. As a result, all the MMSS files may first be read from the UICC and then the generation code of the master system priority list may be run. The reading of the MMSS files from the UICC and generation of the master system priority list may take up to, for example, 26 seconds. A large portion of the time may be spent in reading the PRL from the UICC (e.g., due to granularity, as described above), which may be, for example, 14 kilobytes in size. The time for reading the MMSS files and generating the master system priority list at each power up may affect the performance of the UE.

For certain aspects of the present disclosure, the master system priority list may be generated after power up only when one or more of the MMSS files change. Therefore, the time for acquiring a wireless network upon the power up of a device may be reduced, particularly when MMSS files remain the same as before.

When a master system priority list is generated, the UE may store (e.g., cache) certain parameters related to each MMSS file. These parameters may be stored in non-volatile memory (NV). For example, referring back to FIG. 3, the parameters may be stored in the NVRAM of memory 306. Further, the master system priority list may be stored into NV before powering down. Therefore, for some embodiments, at a subsequent power up, the UE may use the stored master system priority list to scan for systems until (and if) a new master system priority list is generated.

For some embodiments, prior to loading a complete MMSS file (e.g., reading the MMSS file from the UICC), the UE may determine if the MMSS file has changed, as will be described further herein. If there is no change in any of the MMSS files, the stored master system priority list may be used for performing network scanning, and a new master system priority list may not be generated. Further, upon power up, since the UE may begin performing scans using the stored master system priority list, there may be no delay in acquiring a wireless network. Therefore, in situations where there is no change in any of the MMSS files, there may be around, for example, a 20 second savings in power up acquisition of the wireless network. For some embodiments, there may be savings by using a phased approach, for example, by caching the PRL, as will be described below.

Figure 7:
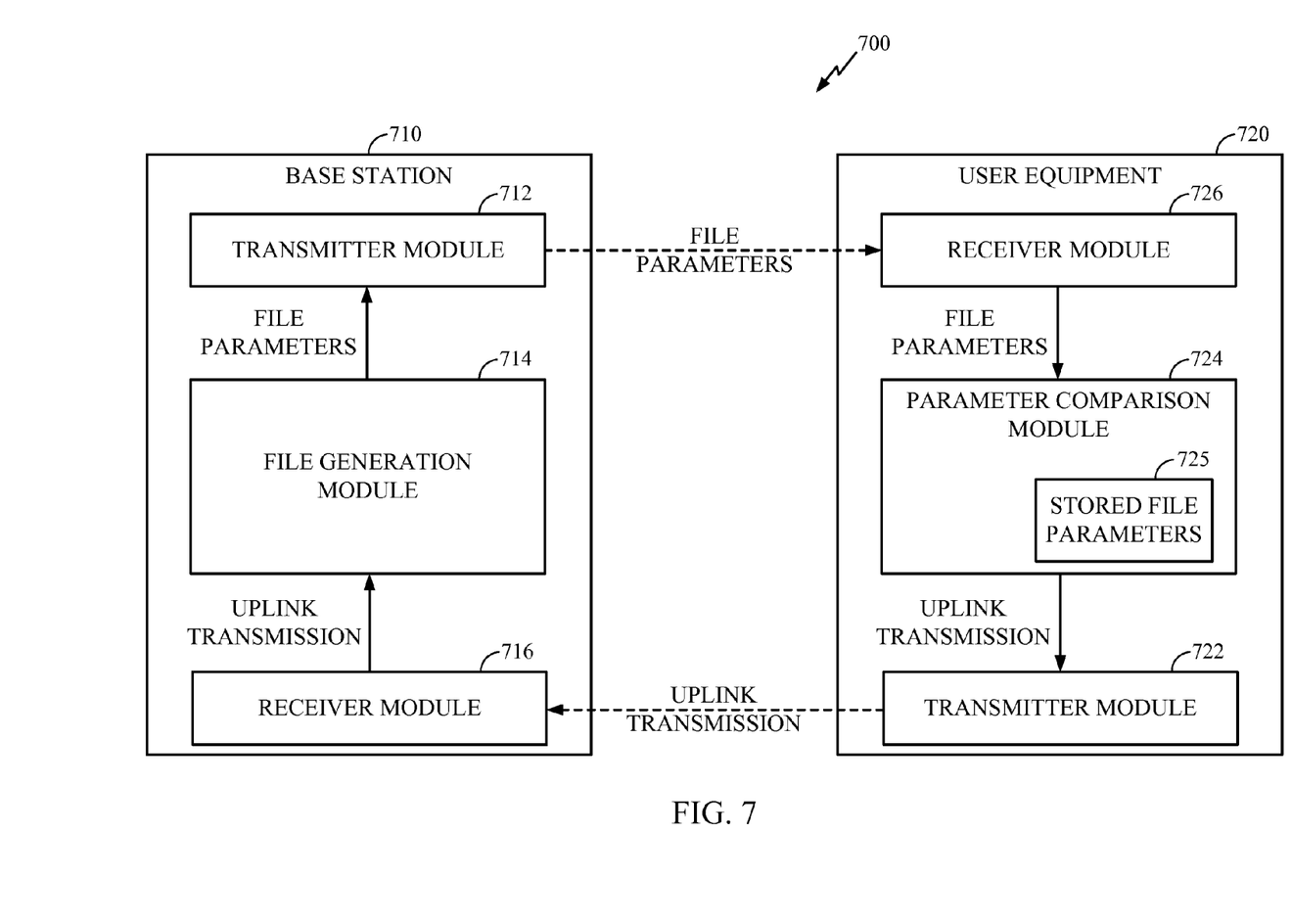
FIG. 7 illustrates an example system with a base station and a wireless device, capable of generating a master system priority list upon the detection of change in one or more system selection files, in accordance with certain aspects of the present disclosure.

FIG. 7 illustrates an example system 700 with a base station 710 and a UE 720, capable of generating a master system priority list upon the detection of change in one or more MMSS files, in accordance with certain aspects of the present disclosure. As illustrated, the base station 710 may include a file generation module 714 for generating MMSS files. Parameters of the MMSS files may be transmitted, via a transmitter module 712, to the UE 720.

The UE 720 may receive the parameters of the MMSS files via a receiver module 726. The UE 720 may compare the received parameters with previously-stored MMSS file parameters, using a parameter comparison module 724. Upon comparison, if there have been no changes in the MMSS file parameters, a stored master system priority list may be used for performing network scanning. Otherwise, a new master system priority list may be generated. The UE 720 may transmit feedback via a transmitter module 722, and the base station 710 may receive the feedback via a receiver module 716.

As described above, priority of 3GPP and 3GPP2 systems may be determined by reading system selection files from the UICC separately, without combining the information from the files into the master system priority list.

Figure 8:
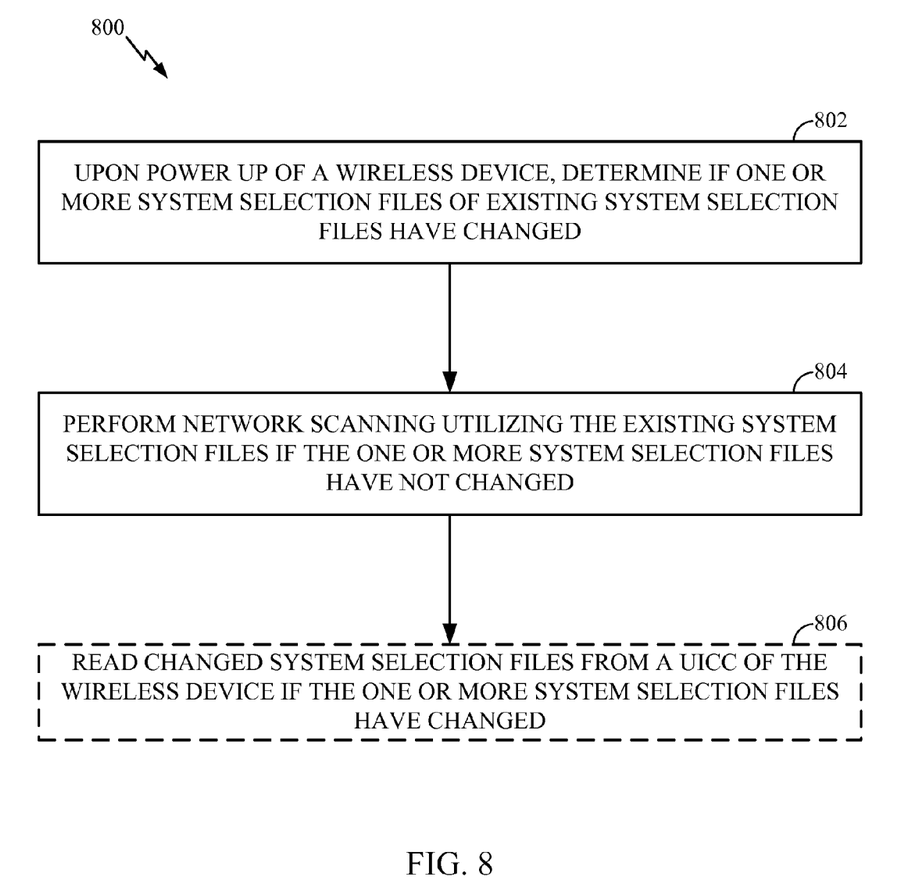
FIG. 8 illustrates example operations for generating a master system priority list upon the detection of change in one or more system selection files, in accordance with certain aspects of the present disclosure.

FIG. 8 illustrates example operations 800 for performing network scanning, in accordance with certain aspects of the present disclosure. The operations 800 may be performed, for example, by a UE.

At 802, upon power up of a wireless device, the UE may determine if one or more system selection files (e.g., that specify system priority rules) of existing system selection files have changed. For some embodiments, the UE may perform network scanning by utilizing the existing system selection files prior to making the determination.

The UE may determine if the existing system selection files have changed by comparing parameters for the existing system selection files with one or more corresponding parameters for new system selection files. For some embodiments, the parameters for the existing system selection files may be stored in a non-volatile memory of the UE. For some embodiments, comparing may include performing a bit-by-bit comparison between the stored parameters and the parameters for the new system selection files. For some embodiments, comparing may include comparing a stored hash value with a hash formed from one or more parameters for the new system selection files.

The parameters for the new system selection files may be read from a UICC of the UE. The parameters utilized for comparison generally include at least one of a version parameter indicating a version of an associated system selection file, a size of the associated system selection file, and a count of a number of records in the associated system selection file. The size of these parameters is smaller than the size of the entire file. Hence, they may be read faster than the entire file.

At 804, the UE may perform network scanning utilizing the existing system selection files if the one or more system selection files have not changed. Moreover, as described above, upon power up, since the UE may begin performing scans using the existing system selection files, there may be no delay in acquiring a wireless network. As described above, the existing system selection files may be used to generate a master system priority list, and performing the network scanning may include utilizing the master system priority list without generating a new master system priority list if the one or more system selection files have not changed.

Optionally at 806, the UE may read changed system selection files from a UICC of the wireless device if the one or more system selection files have changed. Then the UE may perform network scanning utilizing at least the changed system selection files. For some embodiments, parameters related to the updated system selection files may be stored in non-volatile memory. For some embodiments, a new master system priority list may be generated.

The logic for determining whether an MMSS file has changed may be different for each type of MMSS file. For example, a dimensions block for PRL (PRL_DIMENSIONS block) may be used to determine if PRL has changed. The dimensions block generally includes an identifier of the PRL (PRL_LIST_ID), a current PRL list size (CUR_PRL_LIST_SIZE), the number of acquisition records included in the acquisition table of the PRL (NUM_ACQ_RECS), and the number of system records included in the system table of the PRL (NUM_SYS_RECS). As mentioned earlier, the above PRL parameters may be stored in NV when a master system priority list is generated. If the PRL parameters read from the UICC are the same as the stored PRL parameters, the UE may be determine that the PRL has not changed since the last generation of the master system priority list. Since only the dimensions block may be read from the UICC, the amount of data to read may be significantly reduced if there is no change. Therefore, in situations where there is no change in the PRL, there may be savings of, for example, 15-20 seconds by not reading the PRL.

Figure 9:
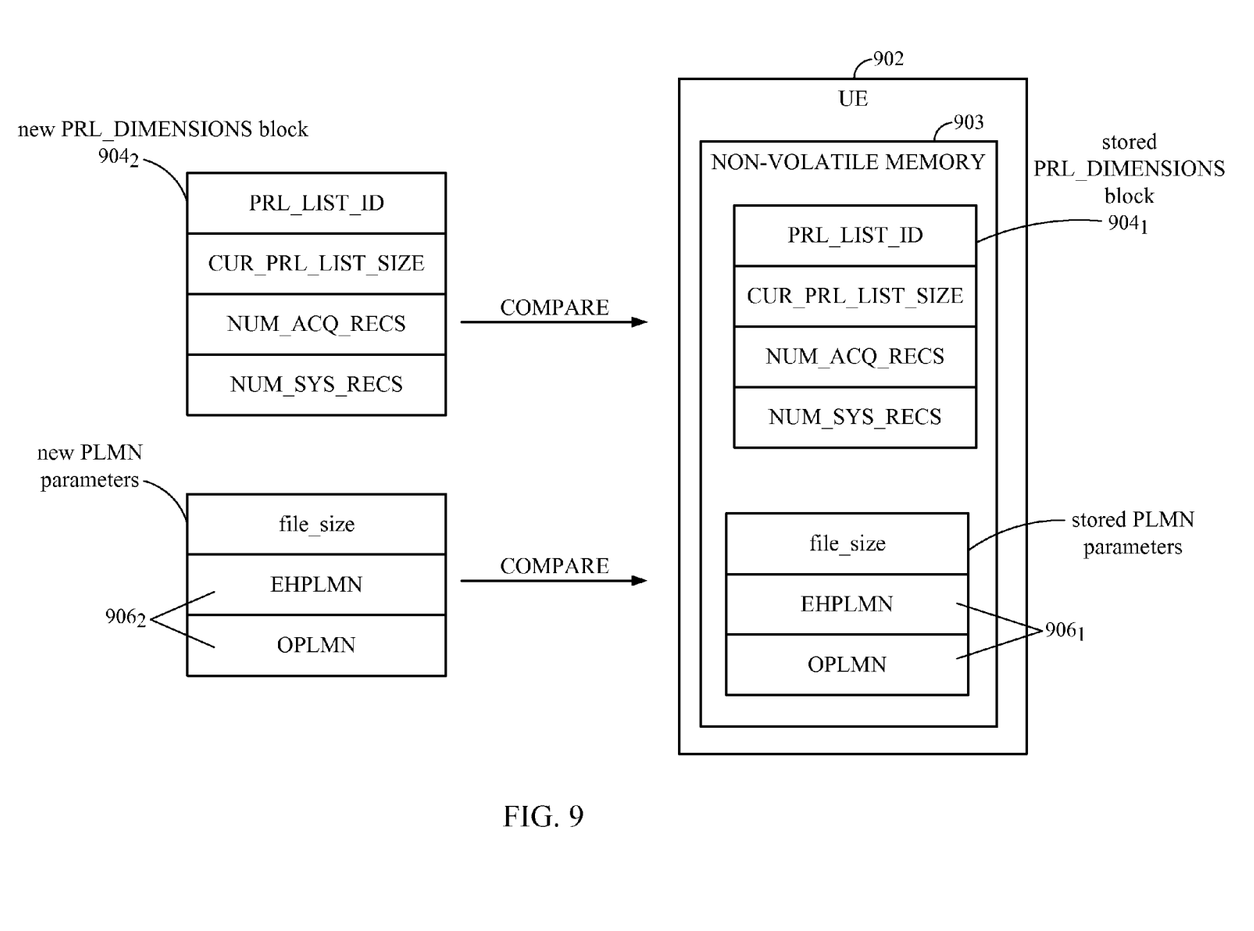
FIG. 9 provides an illustration of the comparison made by a wireless device when determining whether a system selection file has changed, in accordance with certain aspects of the present disclosure.

FIG. 9 provides an illustration of the comparison made by a UE when determining whether a system selection file has changed, in accordance with certain aspects of the present disclosure. As described above, the parameters of system selection files used for generating an existing master system priority list may be stored in a non-volatile memory 903 of a UE 902. For example, the PRL_DIMENSIONS block $904_1$ may be stored in the non-volatile memory 903 of the UE 902. Upon a subsequent power up of the UE 902, the UE may make a determination if one or more system selection files used to generate the existing master system priority list have changed, as described above. For example, as illustrated in FIG. 9, the UE may make a determination if the stored PRL_DIMENSIONS block $904_1$ has changed by comparing with a PRL_DIMENSIONS block $904_2$ of a new PRL (e.g., received from the serving base station). As described above, various entries of the dimensions block may be compared in order to determine if the PRL has changed since the last generation of the master system priority list. For some embodiments, it may be sufficient to compare the PRL_LIST_ID of each block. However, the other entries of the dimensions block may be compared for additional verification.

For MLPL, the UE may compare the MLPL version identification (MLPL_VER_ID), the number of MMSS location associated priority records (NUM_MLPL_RECS), and the MLPL identification (MLPL_ID) with corresponding MLPL parameters that have been stored in NV when the previous master system priority list was generated. For MSPL, the UE may compare MSPL version identification (MSPL_VER_ID) and number of MSPL identifications (NUM_MSPL_ID) with corresponding MSPL parameters that have been stored in NV when the previous master system priority list was generated.

The PLMN files may not have unique identifiers (e.g., version identification) to allow a UE to determine whether the PLMN files have changed since the last master system priority list generation. For some embodiments, a standards change to allow identifying a modified EHPLMN/OPLMN more effectively may be implemented.

For some embodiments, the following approach may be performed by the UE without a standards change. First, the UE may use the file size of the PLMN files as a first level match, as illustrated in FIG. 9. Second, the UE may store the old EHPLMN and OPLMN files $906_1$ (i.e., files used to generate the existing master system priority list) in NV and do a bit-by-bit comparison of the new EHPLMN/OPLMN files $906_2$ with the old EHPLMN/OPLMN files $906_1$. As another example, the UE may store a hash value (e.g., CRC-32 checksum) of the old EHPLMN/OPLMN files (e.g., in NV) and compare the hash formed from the new EHPLMN/OPLMN files with the old hash. Both approaches may require reading of the EHPLMN/OPMN files at power up; however, the reading time may be minimal since these files are smaller than the other MMSS files.

As described above, if there is no change in any of the system selection files, it may not be required for the master system priority list to be regenerated, reducing the time required for a UE to acquire a wireless network upon power up.

Compared to other system selection files, the PRL may be a more granular, detailed list that favors detail of information over storage space requirements, as described above. Therefore, PRL loading may lead to larger delays compared to the loading of the other system selection files. In an effort to reduce the time in acquiring a wireless network, a UE may be focused solely on optimizing PRL loading.

For example, upon power up of a wireless device, the device may determine if a cached PRL (e.g., stored in a non-volatile memory of the UE) used to generate an existing master system priority list has changed, wherein determining generally includes comparing one or more parameters for the cached PRL with one or more corresponding parameters for another PRL (as described above). The device may utilize the cached PRL to perform system selection if the cached PRL has not changed. However, the device may utilize a new PRL to perform the system selection if the cached PRL has changed.

The device may store (i.e., cache) the PRL in NV before powering down. At a subsequent power up, the device may check if the PRL parameters described above are the same as the PRL parameters used to generate the existing master system priority list. If the parameters are the same, the UE may determine not to read the PRL from the UICC, and to use the cached PRL. Otherwise, the PRL may be read from the UICC. For some embodiments, the PRL parameters may be read by reading the first 100 bytes of the PRL (e.g., the PRL_DIMENSIONS block) instead of reading the entire PRL (e.g., 14 kilobyte). After determining whether or not the PRL should be loaded from the UICC, the UE may load the remaining system selection files in order to generate the master system priority list.

The system selection procedure may only begin after the different databases that specify the system priorities are read from the UICC. With the current database sizes used in LTE multimode devices, this process may take up to, for example, 20 seconds. However, reading the different databases may be avoided by using cached copies when possible. If there is no change in any of the databases, an LTE multimode device may determine that the list that specifies the relative priority of 3GPP and 3GPP2 systems need not be regenerated.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
upon power up of a wireless device, determining if one or more system selection files of existing system selection files have changed since the system selection files were last utilized for performing network scanning; and
performing network scanning utilizing the existing system selection files if the one or more system selection files have not changed.

2. The method of claim 1, further comprising:
performing network scanning utilizing the existing system selection files prior to making the determination.

3. The method of claim 1, further comprising:
reading changed system selection files from a Universal Integrated Circuit Card (UICC) of the wireless device if the one or more system selection files have changed; and
performing network scanning utilizing at least the changed system selection files.

4. The method of claim 1, wherein one or more parameters for the existing system selection files are stored in a non-volatile memory of the wireless device.

5. The method of claim 4, wherein determining if the one or more system selection files have changed comprises:
comparing the stored parameters with one or more corresponding parameters for new system selection files read from a Universal Integrated Circuit Card (UICC) of the wireless device.

6. The method of claim 5, wherein the parameters comprise at least one of a version parameter indicating a version of an associated system selection file, a size of the associated system selection file, and a count of a number of records in the associated system selection file.

7. The method of claim 5, wherein comparing comprises:
performing a bit-by-bit comparison between the stored parameters and the parameters for the new system selection files.

8. The method of claim 5, wherein comparing comprises:
comparing a stored hash value with a hash formed from one or more parameters for the new system selection files.

9. The method of claim 1, wherein the system selection files comprise a Preferred Roaming List (PRL), a Public Land Mobile Network (PLMN) file, a Multimode System Selection (MMSS) System Priority List (MSPL), an MMSS Location associated Priority List (MLPL), and Third Generation Partnership Project (3GPP) Base Station Transceivers (BST).

10. The method of claim 1, wherein the existing system selection files are used to generate a master system priority list.

11. The method of claim 10, wherein performing the network scanning comprises:
utilizing the master system priority list without generating a new master system priority list if the one or more system selection files have not changed.

12. The method of claim 11, further comprising:
generating a new master system priority list if the one or more system selection files have changed.

13. The method of claim 1, wherein the one or more system selection files specify system priority rules.

14. An apparatus for wireless communications, comprising:
upon power up of a wireless device, means for determining if one or more system selection files of existing system selection files have changed since the system selection files were last utilized for performing network scanning; and
means for performing network scanning utilizing the existing system selection files if the one or more system selection files have not changed.

15. The apparatus of claim 14, further comprising:
means for performing network scanning utilizing the existing system selection files prior to making the determination.

16. The apparatus of claim 14, further comprising:
means for reading changed system selection files from a Universal Integrated Circuit Card (UICC) of the wireless device if the one or more system selection files have changed; and
means for performing network scanning utilizing at least the changed system selection files.

17. The apparatus of claim 14, wherein one or more parameters for the existing system selection files are stored in a non-volatile memory of the wireless device.

18. The apparatus of claim 17, wherein the means for determining if the one or more system selection files have changed comprises:
   means for comparing the stored parameters with one or more corresponding parameters for new system selection files read from a Universal Integrated Circuit Card (UICC) of the wireless device.

19. The apparatus of claim 18, wherein the parameters comprise at least one of a version parameter indicating a version of an associated system selection file, a size of the associated system selection file, and a count of a number of records in the associated system selection file.

20. The apparatus of claim 18, wherein the means for comparing comprises:
   means for performing a bit-by-bit comparison between the stored parameters and the parameters for the new system selection files.

21. The apparatus of claim 18, wherein the means for comparing comprises:
   means for comparing a stored hash value with a hash formed from one or more parameters for the new system selection files.

22. The apparatus of claim 14, wherein the system selection files comprise a Preferred Roaming List (PRL), a Public Land Mobile Network (PLMN) file, a Multimode System Selection (MMSS) System Priority List (MSPL), an MMSS Location associated Priority List (MLPL), and Third Generation Partnership Project (3GPP) Base Station Transceivers (BST).

23. The apparatus of claim 14, wherein the existing system selection files are used to generate a master system priority list.

24. The apparatus of claim 23, wherein the means for performing the network scanning comprises:
   means for utilizing the master system priority list without generating a new master system priority list if the one or more system selection files have not changed.

25. The apparatus of claim 24, further comprising:
   means for generating a new master system priority list if the one or more system selection files have changed.

26. The apparatus of claim 14, wherein the one or more system selection files specify system priority rules.

27. An apparatus for wireless communications, comprising:
   at least one processor configured to:
      upon power up of a wireless device, determine if one or more system selection files of existing system selection files have changed since the system selection files were last utilized for performing network scanning; and
      perform network scanning utilizing the existing system selection files if the one or more system selection files have not changed; and
   a memory coupled to the at least one processor.

28. The apparatus of claim 27, wherein the at least one processor is further configured to:
   perform network scanning utilizing the existing system selection files prior to making the determination.

29. The apparatus of claim 27, wherein the at least one processor is further configured to:
   read changed system selection files from a Universal Integrated Circuit Card (UICC) of the wireless device if the one or more system selection files have changed; and
   perform network scanning utilizing at least the changed system selection files.

30. The apparatus of claim 27, wherein one or more parameters for the existing system selection files are stored in a non-volatile memory of the wireless device.

31. The apparatus of claim 30, wherein the at least one processor is configured to determine if the one or more system selection files have changed by:
   comparing the stored parameters with one or more corresponding parameters for new system selection files read from a Universal Integrated Circuit Card (UICC) of the wireless device.

32. The apparatus of claim 31, wherein the parameters comprise at least one of a version parameter indicating a version of an associated system selection file, a size of the associated system selection file, and a count of a number of records in the associated system selection file.

33. The apparatus of claim 31, wherein the at least one processor is configured to compare by:
   performing a bit-by-bit comparison between the stored parameters and the parameters for the new system selection files.

34. The apparatus of claim 31, wherein the at least one processor is configured to compare by:
   comparing a stored hash value with a hash formed from one or more parameters for the new system selection files.

35. The apparatus of claim 27, wherein the system selection files comprise a Preferred Roaming List (PRL), a Public Land Mobile Network (PLMN) file, a Multimode System Selection (MMSS) System Priority List (MSPL), an MMSS Location associated Priority List (MLPL), and Third Generation Partnership Project (3GPP) Base Station Transceivers (BST).

36. The apparatus of claim 27, wherein the existing system selection files are used to generate a master system priority list.

37. The apparatus of claim 36, wherein the at least one processor is configured to perform the network scanning by:
   utilizing the master system priority list without generating a new master system priority list if the one or more system selection files have not changed.

38. The apparatus of claim 37, wherein the at least one processor is further configured to:
   generate a new master system priority list if the one or more system selection files have changed.

39. The apparatus of claim 27, wherein the one or more system selection files specify system priority rules.

40. A computer-program product for wireless communications, the computer-program product comprising:
   a non-transitory computer-readable medium having code for:
      upon power up of a wireless device, determining if one or more system selection files of existing system selection files have changed since the system selection files were last utilized for performing network scanning; and
      performing network scanning utilizing the existing system selection files if the one or more system selection files have not changed.

41. The computer-program product of claim 40, further comprising code for:
   performing network scanning utilizing the existing system selection files prior to making the determination.

42. The computer-program product of claim 40, further comprising code for:
  reading changed system selection files from a Universal Integrated Circuit Card (UICC) of the wireless device if the one or more system selection files have changed; and
  performing network scanning utilizing at least the changed system selection files.

43. The computer-program product of claim 40, wherein one or more parameters for the existing system selection files are stored in a non-volatile memory of the wireless device.

44. The computer-program product of claim 43, wherein the code for determining if the one or more system selection files have changed comprises code for:
  comparing the stored parameters with one or more corresponding parameters for new system selection files read from a Universal Integrated Circuit Card (UICC) of the wireless device.

45. The computer-program product of claim 44, wherein the parameters comprise at least one of a version parameter indicating a version of an associated system selection file, a size of the associated system selection file, and a count of a number of records in the associated system selection file.

46. The computer-program product of claim 44, wherein the code for comparing comprises code for:
  performing a bit-by-bit comparison between the stored parameters and the parameters for the new system selection files.

47. The computer-program product of claim 44, wherein the code for comparing comprises code for:
  comparing a stored hash value with a hash formed from one or more parameters for the new system selection files.

48. The computer-program product of claim 40, wherein the system selection files comprise a Preferred Roaming List (PRL), a Public Land Mobile Network (PLMN) file, a Multimode System Selection (MMSS) System Priority List (MSPL), an MMSS Location associated Priority List (MLPL), and Third Generation Partnership Project (3GPP) Base Station Transceivers (BST).

49. The computer-program product of claim 40, wherein the existing system selection files are used to generate a master system priority list.

50. The computer-program product of claim 49, wherein the code for performing the network scanning comprises code for:
  utilizing the master system priority list without generating a new master system priority list if the one or more system selection files have not changed.

51. The computer-program product of claim 50, further comprising code for:
  generating a new master system priority list if the one or more system selection files have changed.

52. The computer-program product of claim 40, wherein the one or more system selection files specify system priority rules.

* * * * *